FIG. 1

INVENTOR.
ROBERT W. TAYLOR
Strauch, Nolan,
Neale, Nies &
Bromaugh
ATTORNEYS

FIG. 2

INVENTOR.
ROBERT W. TAYLOR
BY
Strauch, Nolan, Neale,
Nies & Bronaugh
ATTORNEYS

INVENTOR.
ROBERT W. TAYLOR

BY
Strauch, Nolan, Neale,
Nies & Bronaugh

ATTORNEYS

INVENTOR.
ROBERT W. TAYLOR

BY

ATTORNEYS

+# United States Patent Office 3,512,307
Patented May 19, 1970

3,512,307
PORTABLE SANDING MACHINE IMPROVEMENTS
Robert W. Taylor, Baldwinsville, N.Y., assignor to Rockwell Manufacturing Company, Pittsburgh, Pa., a corporation of Pennsylvania
Filed July 7, 1966, Ser. No. 563,613
Int. Cl. B24b 23/00
U.S. Cl. 51—170                              4 Claims

ABSTRACT OF THE DISCLOSURE

A surface-finishing power tool having an endless, surface-finishing belt adopted to engage a workpiece and trained around a crowned idler pulley and a flanged, uncrowned power driven pulley which comprises a substantially cylindrical hub-mounted elastically deformable pulley body mounted between the pulley flanges and formed with annular, circumferentially extending, outwardly opening grooves defining a multiplicity of uniformly diametered, radially extending, flexible belt-engaging ribs.

---

This invention relates to power tools and particularly to improvements in portable surface-finishing machines of the traveling band type. The present invention is especially concerned with portable sanders and the like wherein a surface-finishing belt is trained around spaced apart motor driven idler pulleys.

A major object of this invention is to provide a portable, belt type surface-finishing machine with an improved latch mechanism for releasably locking an idler pulley assembly in a retracted, belt loosening position to facilitate easy and quick removal and mounting of the surface-finishing belt.

In accordance with the foregoing object, the idler pulley is mounted for limited displacement between forwardly biased, belt tightening and retracted, belt loosening positions along an axis transversely intersecting the idler and motor driven pulley rotational axes. The latch mechanism of this invention enables the idler pulley to be releasably locked in its belt loosening position by turning it about the aforesaid displacement axis which intersects the pulley rotational axes. In this manner, the idler pulley is held in its retracted position against the bias of a belt-tightening spring to facilitate the easy mounting and removal of the surface-finishing belt.

Another object of this invention is to provide a portable, power driven surface-finishing machine having a novel compact, balanced arrangement of parts which renders the machine easily manipulatable and especially adaptable for contour surface finishing work.

The arrangement of parts according to this invention provides a comfortable balance, easy manipulation of the machine, and an unblocked view of the workpiece surface. It also allows the operator to stand comfortably to one side of the machine and to hold his elbows close to his body for firmly guiding the machine. In addition, no part protrudes appreciably beyond the outboard edge of the belt to thus allow the belt to be guided into confined regions and corners. The machine of this invention thus is particularly suitable for finishing automobile body surfaces and the like.

A further object of this invention is to provide a belt-type surface-finishing machine with a novel back-up shoe or pressure platen assembly for supportingly engaging the inner surface of the workpiece engaging belt flight and thereby applying a uniform pressure to the effective working area of the belt. As more specific objects, this invention provides for a novel back-up shoe or platen which is quickly and easily removable and mountable in place, which allows increased flexibility of the working run of the belt to accommodate uneven workpiece contours, and which is compactly located together with a quick change mounting structure between opposed flights of the surface-finishing belt.

Still another object of this invention is to provide a novel, belt-type surface-finishing machine which produces an air screen for protecting the operator against dust and flying particles. This invention provides, as a more specific object, novel structural features which utilize exhausted motor ventilating air to form the air screen mentioned above.

A further object of this invention is to provide a portable, motor driven surface-finishing machine with a novel, readily accessible switch structure for controlling the operation of the motor.

Yet another object of this invention is to provide a belt-type surface-finishing machine with a novel drive and idler pulley structure to insure proper tracking of the surface-finishing belt around the drive and idler pulleys and to minimize the belt wear occasioned by engagement of the belt edges with pulley flanges.

Further objects of this invention will appear as the description proceeds in connection with the appended claims and annexed drawings wherein:

Figure 1:
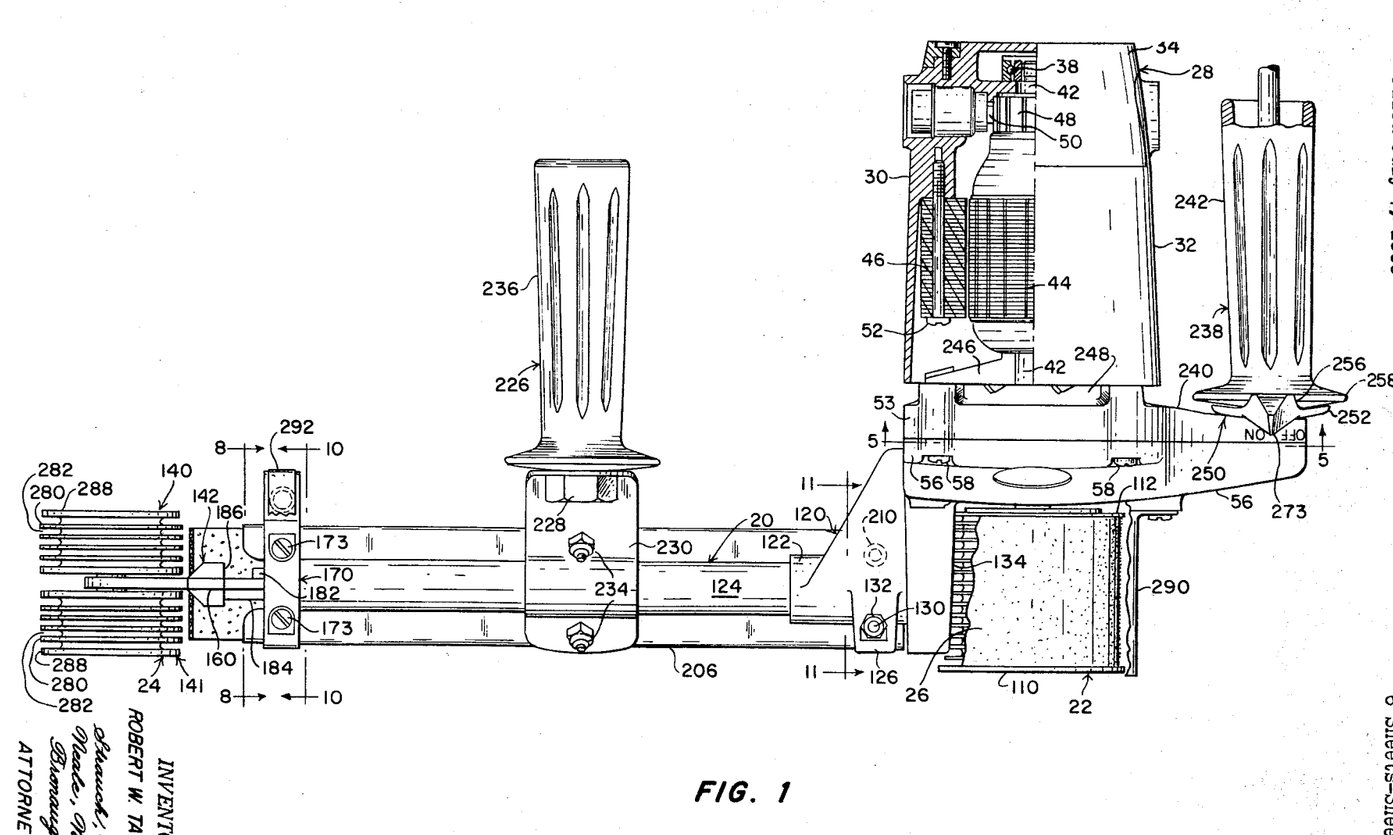
FIG. 1 is a partially sectioned top plan view of a portable belt sanding machine incorporating the principles of this invention.
Figure 2:
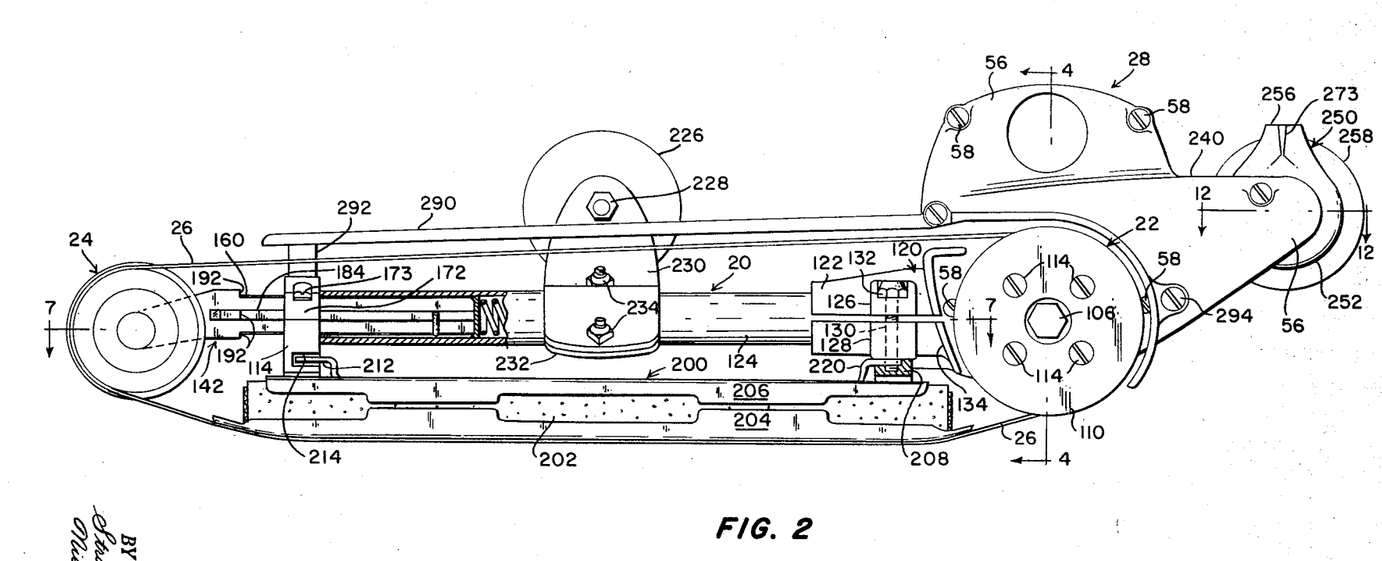
FIGS. 2 and 3 respectively are front and rear elevations of the sanding machine shown in FIG. 1.

Referring now to the drawings and more particularly to FIGS. 1 and 2, the portable, power-operated sanding machine embodying the principles of this invention is shown to comprise a frame 20 which rotatably supports a power-driven pulley assembly 22 and an idler pulley assembly 24 spaced laterally forwardly from pulley assembly 22. An endless, sanding belt 26 of suitable conventional form is trained around pulley assemblies 22 and 24 and has a lower, substantially straight flight for engaging workpieces to be surface-finished. An electric motor 28 is carried by frame 20 for driving pulley assembly 22 in a counterclockwise direction to advance the lower workpiece-engaging belt flight from left to right as viewed from FIG. 2.

Figure 3:
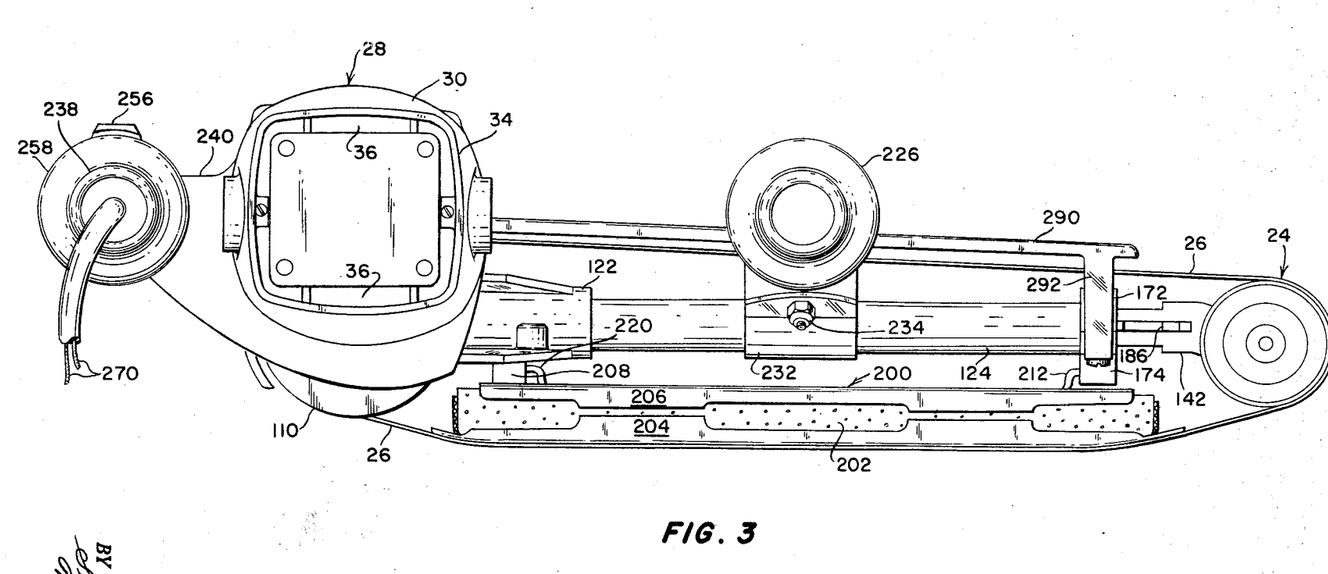

As shown in FIGS. 1–4, motor 28 comprises a housing 30 having a hollow, open-ended cylindrical section 32. An end plate 34 mounted at the rearward end of section 32 defines a series of axially extending air inlet ports 36 as best shown in FIG. 3.

Figures 4, 5:
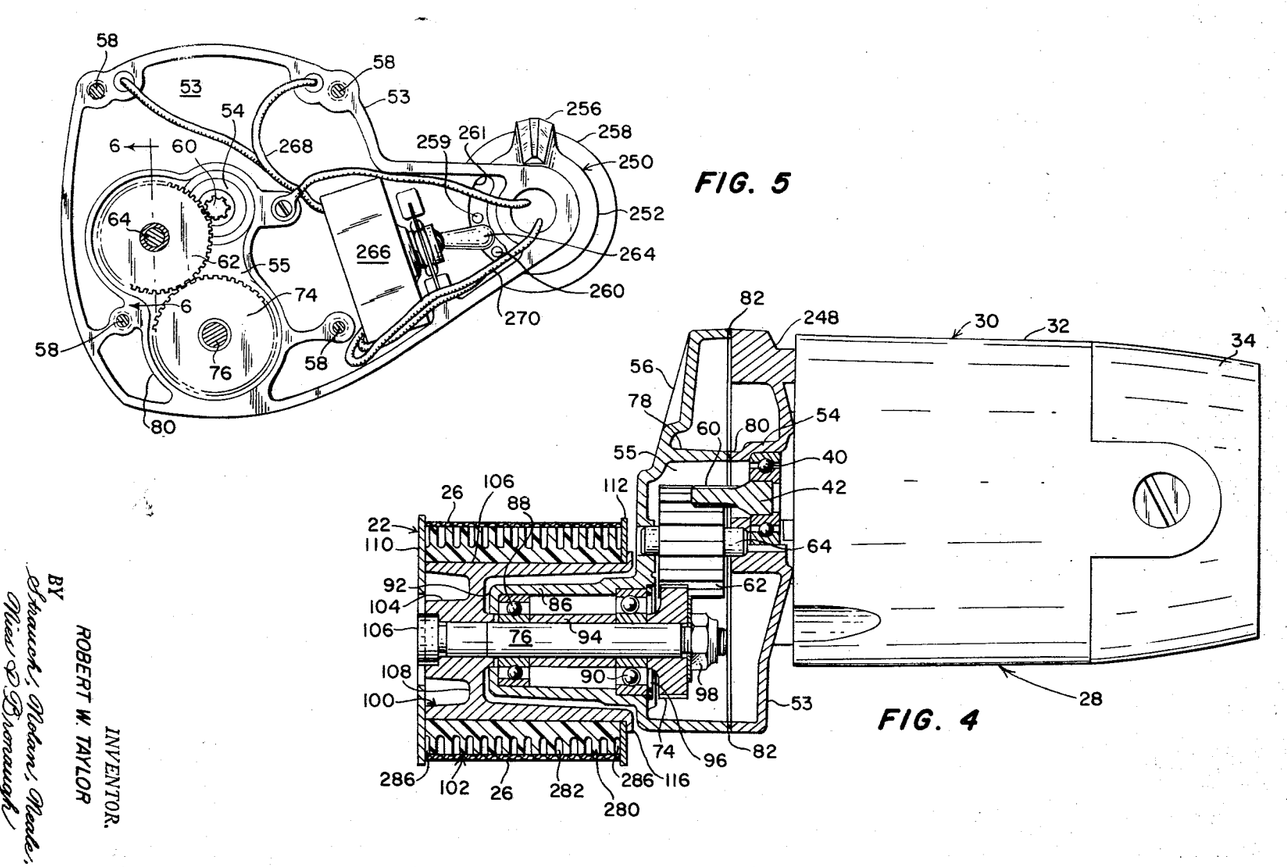
FIG. 4 is a section taken substantially along lines 4—4 of FIG. 2.
FIG. 5 is a section taken substantially along lines 5—5 of FIG. 1.

As best shown in FIGS. 1 and 4, housing 30 mounts a pair of axially aligned, spaced apart anti-friction roller bearing assemblies 38 and 40 which journal a rotor shaft 42 extending coaxially through housing section 32. A rotor 44 mounted on rotor shaft 42 between bearing assemblies 38 and 40 is circumferentially surrounded by a stator 46 and has a commutator section 48 engaged by carbon brushes 50 (one shown in FIG. 1). Stator 46 is securely fixed to housing 32 by cap screws indicated at 52.

As best shown in FIGS. 2 and 4, the forward end of housing section 32 is closed by an end plate 53 having a bored boss 54 which receives bearing 40. The forward end of shaft 42 extends coaxially through boss 54 and into a gear compartment 15.

Gear compartment 55, as shown in FIGS. 4 and 5, is delimited by end plate 53 and a gear housing 56. End plate 53 and housing section 32 are rigidly fixed to gear housing 56 by machine screws 58.

Figure 6:
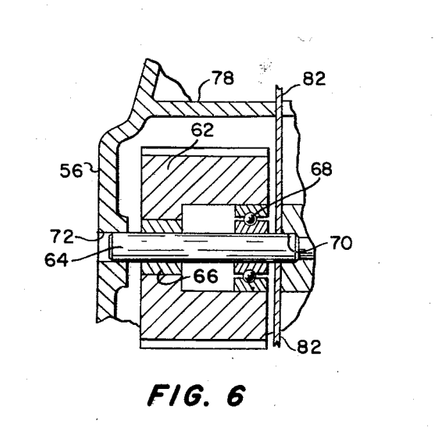
FIG. 6 is a section taken substantially along lines 6—6 of FIG. 5.

Referring to FIGS. 4–6, the forward end of shaft 42 is axially splined at 60 to provide teeth which constantly mesh with a large diametered gear 62 in compartment 55. Gear 62 is journalled on a shaft 64 by axially spaced apart bearings 66 and 68 (see FIG. 6). The rearward end of shaft 64 is press-fitted into a bore 70 formed in end plate 53. The opposite end of shaft 64 is slidably received in an aligning hole 72 bored through gear housing 56.

With continuing reference to FIGS. 4 and 5, gear 62 constantly meshes with a gear 74 which is non-rotatably mounted on a pulley drive shaft 76. The axis of shafts 42, 64, and 76 are parallel. Shaft 64 extends below and to one side of shaft 42, and shaft 76 is vertically below shaft 42.

Gears 74 and 62, as shown in FIGS. 4–6, are received in compartment 55 which is delimited by internal, axially extending. aligned skirt sections 78 and 80 respectively formed integral with gear housing 56 and end plate 53. A gasket 82 clamped between opposed end faces of skirt sections 78 and 80 prevent leakages of gear lubricant from compartment 55. Gear compartment 55 is completely enclosed by skirt sections 78 and 80 and the opposed end wall portions of gear housing 56 and end plate 53. Gears 62 and 74 are sized to provide for a suitable speed reduction and form the gear train drivingly connecting shaft 42 to shaft 76.

As best shown in FIG. 4, gear housing 56 is formed with a forwardly extending pulley support hub 86 through which shaft 76 coaxially and freely extends. Shaft 76 is journalled in axially spaced apart ball bearing assemblies 88 and 90 which are coaxially received in hub 86. Bearing assembly 88 is axially confined between an annular radially extending hub lip 92 and an annuar spacer 94 through which shaft 76 rotatably extends. Bearing assembly 90 is axially confined between spacer 94 and a groove-seated restainer ring 96 carried by gear housing 56. The hub of gear 74 is axially confined between bearing assembly 90 and a lock nut 98 threaded onto the rearward end of shaft 76.

Pulley assembly 22 is shown in FIG. 4 to comprise a rigid, metallic hub 100 and a resilient, belt-engaging tire or annulus 102 which is made from a suitable elastomeric material and which will be described in detail later on. The forward end of shaft 76 protruding beyond hub 86 non-rotatably extends with a press fit through a bored boss section 104 of hub 100. A locking screw 106 is threaded into the outboard end of shaft 76.

Still referring to FIG. 4, hub 100 is formed with an axially extending sleeve section 106 which is integrally joined to boss section 104 by a radial web portion 108. Sleeve section 106 is formed with a smooth, uniformly diametered periphery and extends axially rearwardly to circumferentially surround hub 86. Annulus 102 is press-fitted onto sleeve section 106 axially between pulley flanges 110 and 112. Flange 110 is mounted on the outboard end of hub 100 by machine screws 114 (see FIG. 2). Flange 112 peripherally surrounds sleeve section 106 at the inboard end of hub 100 and is axially confined between the inboard end face of annulus 102 and a radially outwardly turned, annular lip 116 formed integral with sleeve section 106. This construction of pulley assembly 22 provides for easy assembly and disassembly of hub 100, annulus 102, and flanges 110 and 112.

From the pulley, motor, and gear housing construction thus far described, it will be appreciated that pulley assembly 22 is mounted forwardly of gear housing 56 and motor 30 is mounted rearwardly of housing 56. The rotor axis of motor 30 is parallel to and vertically above the rotational axis of pulley assembly 22 when the sanding machine is held in a horizontal position. Assembly 22 and gear 74 may be disassembled as a unit from the unitary sub-assembly of motor 30, end plate 56, gear 62 and shaft 64 by removing screws 58.

As best shown in FIGS. 1 and 2, a frame-mounted bracket 120 preferably formed integral with gear housing 56 extends forwardly from the front face of housing 56 and between pulley assemblies 22 and 24. Bracket 120 is integrally formed with a split collar section 122 along an axis normally intersecting the rotational axis of shaft 76 substantially midway between flanges 110 and 112. The rearward end of an idler pulley support tube 124 forming a part of frame 20 is coaxially received in collar section 122. The split portions of collar section 122 are integrally provided with lateral ears 126 and 128. A machine screw 130 extending through aligned bores in ears 126 and 128 is threaded into a nut 132 to tightly clamp the rearward end of tube 124 in collar section 122.

Still referring to FIGS. 1 and 2, bracket 120 is integrally formed with a fender plate section 134 extending between pulley assembly 22 and collar 122. Fender section 134 comprises a skirt extending the length of pulley assembly 22 and in close proximity to the belt-engaging periphery of annulus 102 between opposed flights of belt 26 to deflect particles downwardly and rearwardly.

Figure 7:
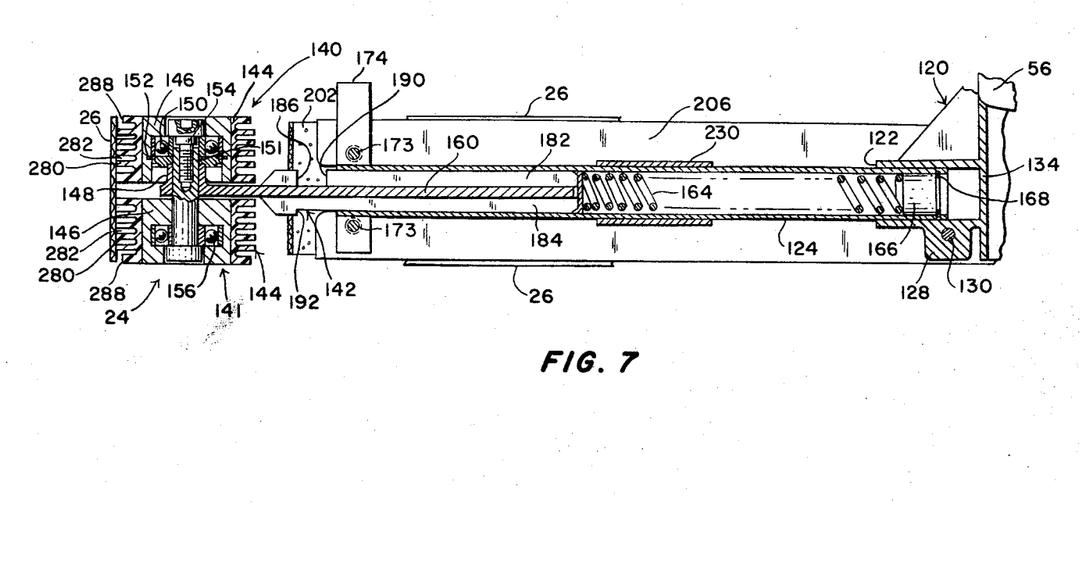
FIG. 7 is a section taken substantially along lines 7—7 of FIG. 2.

As shown in FIGS. 1, 2, and 7, tube 124 extends forwardly between opposed flights of belt 26 and supports idler assembly 24 at its forward end. Idler assembly 24 comprises a pair of aligned, axially spaced apart roller units 140 and 141 and a biasing plunger 142.

Roller unit 140, as best shown in FIG. 7, comprises a resilient tire or annulus 144 which is made of suitable elastomeric material such as rubber and which is coaxially mounted on a rigid hub 146. Plunger 142 extends between roller units 140 and 141 and has an axially extending arm portion 148 received in hub 146. An anti-friction roller bearing assembly 150 is mounted on a member 151 extending through arm portion 148. Bearing assembly 150 supports hub 146 for rotation about an axis normally intersecting the longitudinal axis of support tube 124 and axially aligning with the rotational axis of roller unit 141. Hub 146 is press-fitted on the outer race of bearing assembly 150. Bearing assembly 150 is axially retained between a retainer ring 152 and the head of a machine screw 154 coaxially threaded into the end of member 151.

Roller unit 141 is of the same construction as roller unit 140. Accordingly, like reference numerals have been used to identify like parts. A bearing assembly 156 mounted on member 151 journals roller unit 141 for rotation about an axis aligning with roller unit 140. Roller units 140 and 141 are axially confined between the head of screw 154 and the enlarged head of member 151.

From this description, it is clear that roller units 140 and 141 are independently mounted for rotation on plunger 142. This construction enables all of the idler frame support parts to be located laterally inwardly of a plane containing the outboard edge of belt 26. From FIG. 1 it is apparent that no parts except flange 110 project beyond a plane containing the end faces of roller unit 141 and the sub-assembly of annulus 102 and hub 100. This feature enables the sanding machine of the present invention to be used effectively in performing contour sanding or other surface-finishing operations as on automobile bodies since belt 26 can readily be positioned in confined corners without interference from parts forming the sanding machine assembly.

With continued reference to FIG. 7, plunger 142 slidably and rotatably extends into support tube 124 and is formed with a flat-sided plate section 160. The width of plate section 160 extending into support tube 124 is made sufficiently small to provide a sliding fit that enables plunger 142 to be rotated about the axis of tube 124 for a purpose to be explained shortly.

A helically coiled spring 164 received in support tube 124 is compressed between the rearward end of plunger 142 and a cylindrical plug 16. Spring 164 reacts against plug 166 to bias plunger 142 and idler assembly 24 forwardly along the axis of tube 124 to tighten belt 26. Plug 166 is urged axially rearwardly by spring 164 into abutment with a split, groove-seated retainer ring 168 in the rearward end of tube 124.

Figure 8:
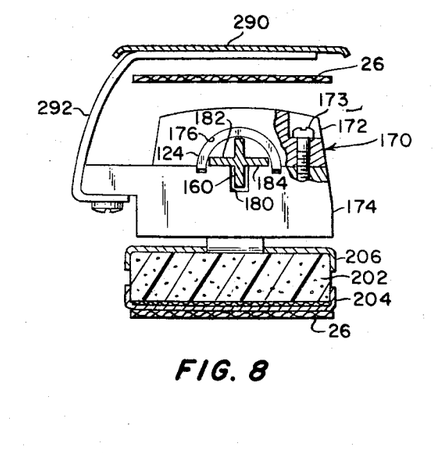
FIG. 8 is a section taken substantially along lines 8—8 of FIG. 1.
Figure 9:
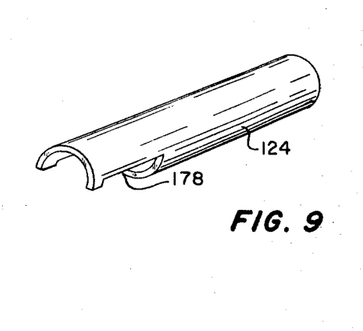
FIG. 9 is a perspective view of the pulley support tube shown in FIGS. 1 and 2.

As shown in FIGS. 1, 2, and 8, a bracket assembly 170 is mounted on the forward end of support tube 124 for retaining the rotational axis of idler assembly 24 parallel with the rotational axis of drive pulley assembly 22 when plunger 142 is urged forwardly by spring 164 to its belt tightening position. Bracket assembly 170, as best shown in FIG. 8, comprises a clamping block 172 fixed by machine screws 173 to a support bracket 174. Clamping block 172 is formed with a smooth-walled, arcuate groove which cooperates with the planar top face of bracket 174 to form a semi-circular channel 176. The forward end of support tube 124 is notched at 178 (see FIG. 9) and extends coaxially through channel 176. The downwardly facing, forward edges of notch 178 are received in parallel, longitudinally extending, upwardly facing grooves formed in the top surface of bracket 174. This forward, notched end of support tube 124 is clamped tightly between block 172 and bracket 174 by tightening screws 173.

With continued reference to FIG. 8, bracket 174 is formed with a flat-sided, flat-bottomed groove 180 which opens upwardly into channel 176. The lower portion of plate section 160 freely extends through groove 180 with sufficient clearance on both sides to allow plunger 142 to be turned in both directions through limited angular distances about the longitudinal axis of support tube 124.

As shown in FIGS. 7 and 8, plunger 142 is integrally formed with flat-sided, parallel arm portions 182 and 184 extending at right angles from the opposite sides of plate section 160 about midway between the upper and lower edges thereof. When plunger 142 is in its forwardly biased, belt tightening position shown in FIGS. 7 and 8, the undersides of arm portions 182 and 184 seat against the planar top face of bracket 174 to prevent angular displacement of plunger 142 in either direction. Abutment of arm portions 182 and 184 against bracket 174 retains plate section 160 in a plane normally intersecting the rotational axis of pulley assembly 22 to thus maintain the rotational axis of idler assembly 24 parallel to that of assembly 22.

In accordance with this invention, arm portion 182 is formed with a flat-sided, laterally outwardly opening notch 186 which cooperates with bracket 174 to provide a twist latch for releasably retaining plunger 142 in a retracted, belt-slackening position. Notch 186 is located forwardly of bracket 174 when plunger 142 is in its forwardly biased, belt-tightening position where the undersides of arm portions 182 and 184 butt against the top face of bracket 174 to prevent rotation of plunger 142. Notch 186 is formed with a uniform width that is slightly greater than the longitudinal length of bracket 174 in the region of groove 180. When notch 186 is aligned with bracket 174, therefore, plunger 142 may be turned in a clockwise direction (as viewed from FIG. 10) such that the upper edge region of bracket 174 passes through notch 186. This displacement of plunger 142 is limited by abutment of the lower edge of plate section 160 against the edge of groove 180. With plunger 142 in its angularly displaced position shown in FIG. 10, the forwardly facing edge 190 (see FIG. 7) of notch 186 faces and is urged by spring 164 into abutment with the rearwardly facing end face of bracket 174 adjacent groove 180 to axially lock plunger 142 in a retracted, belt-slackening position.

When it is desired to latch plunger 142 in its retracted position, idler assembly 24 and plunger 142 are unitarily pushed rearwardly against the bias of spring 164 by gripping idler assembly 24 and applying pressure with the palm of the hand along the portion of belt 26 trained around roller units 140 and 141. When plunger 142 is rearwardly displaced by a sufficient distance to align notch 186 with bracket 174, the sub-assembly of idler assembly 24 and plunger 142 is then turned slightly in a counterclockwise direction (as seen from FIG. 8) to position edge 190 axially opposite the rearwardly facing surface of bracket 174. The sub-assembly of idler assembly 22 and plunger 142 is now released, allowing the bias exerted by spring 164 to shoulder edge 190 against the rearward end face of bracket 174. In this locked position, plunger 142 and idler assembly 24 are axially retracted from their forwardly biased positions by a sufficient distance to slacken and thereby enable the removal of belt 26. Rearwardly facing positioning shoulders 192 are provided on plate section 160 and arm portions 182 and 184 to butt against the forward face of bracket assembly 170 when notch 186 aligns with bracket 174 in its retracted position.

When it is desired to release plunger 142 from latching engagement with bracket 174, belt 26 is positioned around pulley assemblies 22 and 24 and the sub-assembly of idler assembly 24 and plunger 142 is turned until edge 190 clears the top face of bracket 174. Plunger 142 is then released, allowing arm portions 182 and 184 to pass over the top face of bracket 174 as plunger 142 and idler assembly 24 are urged by spring 164 to their forward, belt-tightening positions. It thus will be appreciated that the simplified twist latch of this invention provides for the ready removal and mounting of belt 26.

In further accordance with this invention, a back-up shoe assembly 200 is removably mounted on frame 20 for supporting the lower workpiece engaging run of belt 26. Assembly 200, as shown in FIG. 2, extends between pulley assemblies 22 and 24 and comprises a resilient pad 202 seated between a rigid pressure or facing plate 204 and a rigid backing plate 206. Facing plate 204 has a flat, smooth surface which engages the inwardly facing surface of the lower belt flight. The ends of plate 204 are smoothly curved and upwardly turned to provide rounded corners which do not gouge into the belt. The side edges of plate 204 are bent upwardly to form a longitudinal channel receiving the lower portion of pad 202. Pad 202 may be formed from one or more layers of suitable resilient material such as polyurethane and spaces backing plate 206 vertically above plate 204. The side edges of plate 206 are bent to provide a downwardly facing channel in which pad 202 is seated.

Plate 204 is separable from pad 202 and is snugly held against the bottom face of the pad by the tension in the lower belt flight. This belt tension urges backing plate 206 into abutment with the bottom face of bracket 174 and the bottom face of a back-up shoe mounting plate 208. Plate 208 is fixed to collar section 122 by screw 130 and by a further screw 210 (FIG. 1).

Figure 10:
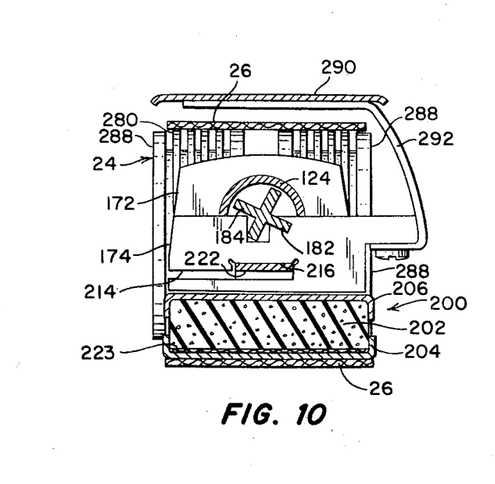
FIG. 10 is a section taken substantially along lines 10—10 of FIG. 1.

As shown in FIGS. 2 and 10, backing plate 206 is integrally formed with a raised forwardly extending tongue 212 which slidably extends into a rearwardly and sidewardly opening, flat-sided groove 214. Tongue 212 is straight and extends essentially in parallel relation with the longitudinal axis of tube 124. Groove 214 is formed in bracket 174 and extends horizontally from a region vertically below tube 124 to the side of bracket 174.

At its inner end, groove 214 is formed with a downwardly opening recess 216 located below tube 124 and substantially medially intersected by a plane containing the longitudinal axis of tube 124. Tongue 212 is urged upwardly to seat in recess 216 by the tension in the lower belt flight. The flights of belt 26, as previously mentioned, are tensioned as a result of the bias exerted by spring 164.

Figures 11, 12:
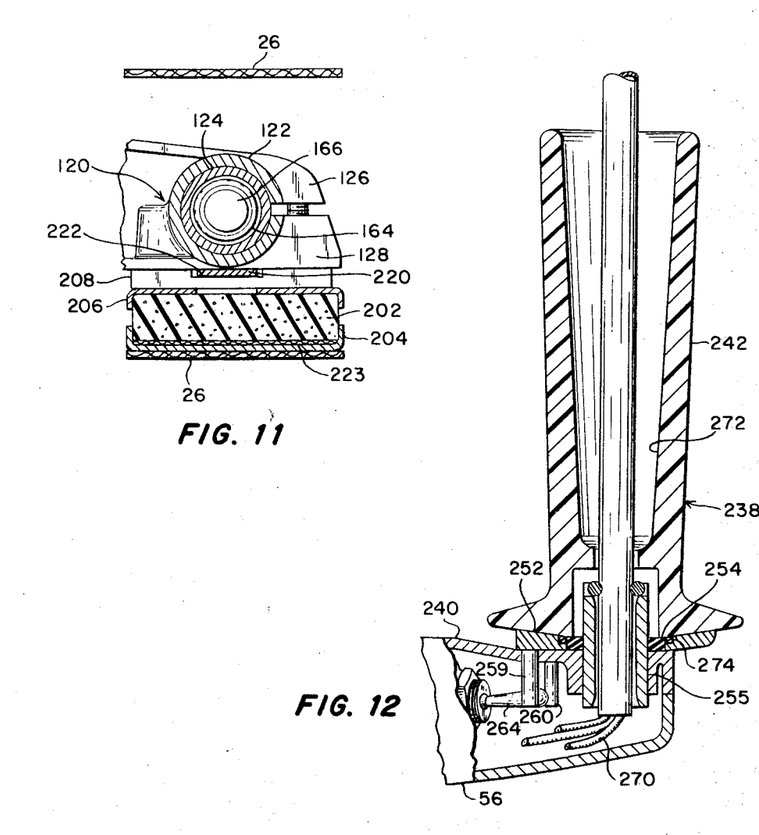
FIG. 11 is a section taken substantially along lines 11—11 of FIG. 1.
FIG. 12 is a section taken substantially along lines 12—12 of FIG. 2.

As shown in FIGS. 2 and 11, backing plate 206 is integrally formed with a second rigid tongue 220 which is parallel to, but extends in the opposite direction from tongue 212. Tongue 220 extends into a forwardly and upwardly opening groove 222 formed in plate 208. When belt 26 is advanced, the frictional engagement between the lower belt flight and back-up shoe assembly 200 urges tongue 220 to a position of maximum projection into groove 222. Engagement of tongues 212 and 220 with the side edges of recess 216 and groove 222 respectively prevents lateral displacement of back-up shoe assembly 200 relative to belt 26.

Back-up shoe assembly 200 is quickly and easily removed simply by pressing the forward end forwardly to a position where tongue 212 clears recess 216 and then by swinging the forward end of the assembly in a direction to move tongue 212 out through the side opening of groove 214. Assembly 200 readily pivots about an axis passing through tongue 220 at right angles to the axis of tube 124, thereby enabling tongue 212 to easily be slid out of groove 214. After tongue 212 is removed from groove 214, assembly 200 is shifted forwardly to remove tongue 220 from groove 222. When assembly 200 is mounted on frame 20 tongue 220 is first inserted into groove 222 and tongue 212 is then inserted sidewardly into groove 214. The tension in the lower belt flight snaps tongue 214 into recess 216.

Removal and insertion of assembly 200 is more easily facilitated by first latching the sub-assembly of idler 24 and plunger 142 in its retracted position to loosen belt 26. This quick-change feature provides for the quick and ready replacement of back-up shoes of varying shapes to obtain access to surfaces of different contours.

In accordance with this invention, pad 202 is compressible to allow limited rocking movement of facing plate 204 about an axis extending parallel to and vertically below the axis of tube 124. This rocking motion provides the lower belt flight with sufficient flexibility to allow it to follow and engage uneven workpiece contours. Plate 204 thus effectively floats on the cushion provided by pad 202 to assure a more uniformly finished surface.

Advantageously, a covering 223 (see FIG. 10 and 11) is adhered to the bottom face of pad 202. Covering 223 may be made from any suitable material which preferably is similar to the surface-finishing belt material. With this construction, facing plate 204 may optionally be removed to allow covering 223 to seat against the inside surface of the lower belt flight. This provides the lower belt flight with greater flexibility.

As shown in FIGS. 1 and 2 a forward, tool manipulating handle 226 is fixed by a machine screw 228 to an upstanding ear of a mounting bracket 230. Bracket 230 is removably fixed to tube 124 by a clamping plate 232 and two bolt and nut assemblies 234.

Handle 226 has a cylindrically elongated gripping section 236 extending along an axis that is substantially at right angles to a plane containing the inboard side edge of belt 26. Gripping section 236 is laterally offset from belt 26 on the same side as motor 28 and is essentially parallel with the rotational axis of motor shaft 42. Handle 226 is disposed forwardly of motor 28 and extends along an axis that passes above the top flight of belt 26. The axis of gripping section 236 is contained in a plane normally intersecting the axis of tube 124 about midway between pulley assemblies 22 and 24.

Still referring to FIGS. 1 and 2, a second tool manipulating handle 238 is mounted on an extension 240 forming a part of end plate 53 and extending laterally from motor 30 to a region that is rearwardly of pulley assembly 22. Handle 238 has a cylindrically elongated gripping section 242 which is substantially coextensive and parallel with gripping section 236. Gripping section 242 thus extends parallel with motor 28 and is disposed rearwardly of pulley assembly 22. Motor 28 is thus positioned between handles 226 and 238. The longitudinal axes of gripping sections 236 and 242 are contained in a plane which is substantially parallel with the opposed runs of belt 26.

With the foregoing arrangement of handles 226 and 238 relative to motor 28 and the other parts of the sanding machine, the operator is able to stand to one side of the machine, gripping handles 226 and 238 in the palms of his hands. Handles 226 and 238 are spaced sufficiently close to enable the operator to position his elbows close to this body when holding the sanding machine about waist high in front of him.

By locating motor 28 laterally to one side of belt 26, the overall center of gravity of the sanding machine is located between handles 226 and 238 since motor 30 represents the heaviest component of the machine. Handles 226 and 238 are so spaced on opposite sides of motor 28 as to balance the weight to be carried at each handle. This unique arrangement of parts thus provides for a well-balanced portable tool that is easily and comfortably manipulatable.

In further accordance with this invention, a fan 246 (see FIG. 1) is non-rotatably mounted on the forward end of rotor shaft 42 in close radial alignment with circumferentially spaced apart air discharge ports 248. Ports 248 are defined by rearward opening recesses in end plate 53 and the opposing, forward end of motor housing section 32.

When motor 28 is energized, fan 246 draws air into housing 30 through ports 36 at the rearward end of motor 28. This air is drawn axially over the rotor and stator surfaces and the rotor shaft bearings and is discharged by fan 246 radially through ports 248 to form a protective air screen when it is essentially parallel to the plane containing the inboard side edge of belt 26 and which normally intersects the forward ends of handles 226 and 238.

Owing to the arrangement of handles 226 and 238 with the other parts of the sanding machine, the air screen provided by fan 246 extends between the operator's face and belt 26. This air screen thus makes use of the exhaused motor ventilating air to deflect dust and chips away from the operator's face.

In further accordance with this invention a switch actuator 250 for controlling the operation of motor 28 is shown in FIGS. 1 and 12 to be mounted at the inner end of handle 238 so that the operator can conveniently shift it between on and off positions with his thumb while grasping handle 238 in the palm of his hand. Actuator 250 comprises a collar 252 which is rotatably mounted on a short sleeve 254. Sleeve 254 is coaxially threaded onto a nipple 255 which is threaded into a tapped bore formed through extension 240. The outer end of nipple 255 is threaded into the inner end of handle 238 to thus fix handle 238 to extension 240.

A thumb engaging projection 256 (see FIGS. 1 and 2) formed integral with collar 254 extends radially beyond the inner end of handle 238 which is flanged at 258. Also formed integral with collar 254 are a pair of parallel, spaced apart, axial fingers 259 and 260 which, as shown in FIG. 5, extend through an arcuate slot 261 in extension 240.

With continued reference to FIG. 5, fingers 259 and 260 extend on opposite sides of a switch operating stem 264 which forms a part of a conventional toggle switch 266. Switch 266 is received in gear housing 56 and is fixed between opposed faces of extension 240 and gear housing 56. The output terminals of switch 266 are connected by leads 268 to stator 46. The input terminals of switch 266 are connected to sheath covered electrical conductors 270 which extend through nipple 255 and through handle 238, the interior of which is hollowed out as indicated at 272 in FIG. 12.

By engaging projection 256 with his thumb, the operator can rotate actuator 250 in opposite directions to alternately engage fingers 259 and 260 with stem 264, thereby tripping stem 264 between its on and off positions. Projection 256 advantageously terminates in a pointer 273 (FIG. 1) which cooperates with markings on extension 240 to indicate whether switch 266 is in its on position or its off position. A groove-seated, O-ring 274 (FIG. 12) carried by collar 252 is axially compressed against the inner flanged end of handle 238 to provide an annular seal for preventing dirt and other foreign particles from entering the housing space in which switch 266 is mounted.

In the manufacture of the sanding machine of this invention, pulley assemblies 22 and 24 are accurately assembled on frame 20 by using a suitable jig to assure that the drive and idler pulley rotational axes are closely parallel. Close parallelism of the pulley axes improves the tracking of belt 26 around the pulley assemblies to minimize sideward belt movement and consequential, objectionable, wear producing engagement of the belt edges with pulley flanges 110 and 112.

Despite accurate assembly of the sanding machine parts, however, the pulley rotational axes usually are not perfectly parallel owing to unavoidable manufacturing tolerances. This non-parallelism, which would normally result in some sideward movement of belt 26, is compensated for by the special construction of tires 102 and 144 which will now be described.

As best shown in FIG. 4, tire 102 is integrally formed with a series of radially outwardly extending, parallel spaced apart, flexible ribs 280 of uniform diameter. Ribs 280 are disposed in side-by-side relation circumferentially around the pulley body.

With continuing reference to FIG. 4, ribs 280 define a series of circumferential, radially outwardly opening, flat-sided grooves 282 of uniform depth and width. The depth of grooves 282 is shown to be greater than the thickness of ribs 280, and the axial spacing between adjacent ribs is made sufficiently large such that one rib does not objectionably interfere with the other if it is flexed.

When motor 28 is energized to advance belt 26, flanges 110 and 112 limit sideward movement of belt 26. This sideward movement may be the result of a side thrust applied by the operator in moving the belt laterally over the workpiece surface. It also may be the result of an inherent non-parallelism between the rotational axes of pulley assemblies 22 and 24, manufacturing imperfections in the surface-finishing belt, or belt distortion.

The construction of ribs 280 is such that they will be flexed laterally by a very small distance from planes normally intersecting the pulley rotational axis when belt 26 is moved laterally towards either if the pulley flanges. Ribs 280 provide no more than a negligible reaction surface against which a side thrust can act to drive belt 26 into engagement with either flange 110 or flange 112. As a result, the action force tending to drive belt 26 into engagement with either of the pulley flanges will also be negligible since it cannot exceed the magnitude of the reaction force. Without a solid reaction surface, belt 26 effectively floats on ribs 280.

By minimizing the magnitude of the belt side thrust in this manner, wear of the belt edges by engagement with flanges 110 and 112 is minimized. It thus will be appreciated that instead of utilizing an opposing force to keep belt 26 centered, this invention substantially eliminates the action force or side thrust by reducing the reaction force at ribs 280 to a negligible magnitude. In this manner, the inherent manufacturing imperfections of the sanding machine are compensated for to insure correct tracking of the belt around the pulley assemblies.

The idler tires 144, as shown in FIGS. 1 and 7, are provided with a rib and groove construction which is the same as that just described for tire 102. Accordingly, like reference numerals have been used to designate the ribs and grooves. The function of the rib and groove construction of tires 144 is the same as that explained for tire 102.

Referring back to FIG. 4, it will be noted that circumferential, radially outwardly opening grooves 286 are formed between the endmost ones of the drive pulley ribs 280 and the opposed faces of flanges 110 and 112. Grooves 286 provide spaces to allow the endmost ribs 280 to flex toward flanges 110 and 112. Grooves 286 also prevent the edges of belt 26 from becoming wedged between the endmost pulley tire ribs and the opposed faces of flanges 110 and 112.

The diameters of flanges 110 and 112 are sufficiently large to prevent belt 26 from climbing over the flanges. These flange diameters, however, are not made so large that they are likely to engage and mark the workpiece surface.

As shown in FIGS. 1 and 7, pulley assembly 24 is flangeless, and the two outermost tire ribs 288 of assembly 24 are smaller in diameter than the remaining tire ribs which are uniformly diametered. This novel construction keeps belt 26 from becoming lodged between the adjacent outermost pair of ribs and from jumping ribs 288 when a side thrust is exerted. It was found that when ribs 288 were formed with the same diameter as the remaining tire ribs, belt 26 would tend to become lodged behind either of the outermost ribs and then jump the outermost rib as though it were a flange when sideward pressure was exerted on the belt. When the side pressure ceased, the belt would jump back, thus moving in an erratic path. In addition to eliminating this objectionable condition, the reduced diameter of ribs 288 effectively provides pulley assembly 24 with a crowned configuration owing to the tendency of the tire ribs to deform. The crown in idler assembly 24 further minimizes sideward movement of belt 26.

Advantageously, a belt guard 290 may be removably mounted on frame assembly 20. Guard 290 is disposed above and parallel with the upper belt flight. The rearward end of guard 290 is curved to extend partially around pulley assembly 22. The forward end of guard 290 is detachably fixed to frame 20 by a bracket and machine screw assembly 292. The rearward end of guard 290 is secured to gear housing 56 by a machine screw 294.

Referring back to FIG. 2, back-up shoe assembly 200 may be reversibly mounted on frame 20 since tongues 212 and 220 are substantially of the same construction, each being insertable into either groove 214 or groove 222. Thus, assembly 200 may be turned 180 degrees and mounted in place by inserting tongues 212 and 220 respectively into grooves 222 and 214. The advantage of this reversible back-up shoe construction is that the forward and rearward ends of plate 204 may be provided with different configurations for alternate use simply by reversing the position of assembly 200. In the position of assembly 200 shown in FIG. 2, the forward upturned end of plate 204 adjacent to pulley assembly 24 is provided with a more gradual and more elongated curvature than the rearward end thereof. Thus, a more gradually inclined workpiece surface may be finished uniformly. If the workpiece surface is so contoured that a shorter, upwardly curved pressure plate end is needed to obtain a uniform finish, the operator simply reverses back-up shoe assembly 200 to place the presently shown rearward end adjacent to pulley assembly 24.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a power tool for surface finishing workpieces, a frame, an idler pulley having an essentially crowned configuration and being rotatably mounted on said frame, a flanged, uncrowned power driven pulley laterally spaced from said idler pulley and being rotatably mounted on said frame, and an endless workpiece surface finishing belt trained around said pulleys, said power driven pulley comprising a substantially cylindrical, hub-mounted elastically deformable pulley body formed with annular circumferentially extending, outwardly opening grooves defining a multiplicity of uniformly diametered, radially extending, flexible, belt-engaging ribs, said idler pulley being flangeless and comprising elastically deformable body means formed with annular, circumferentially extending, outwardly opening groves defining a multiplicity of radially extending, flexible, belt-engaging ribs contained in parallel spaced apart planes normally intersecting the rotational axis of said idler pulley.

2. The combination defined in claim 1 wherein the endmost ribs of said idler pulley are of smaller diameter than the ribs therebetween and wherein the ribs between said endmost ribs are uniformly diametered to cooperate with the endmost ribs to form the crown on said idler pulley.

3. In a portable, hand-manipulatable, power tool for surface finishing workpieces, a frame, a flanged, uncrowned power-driven pulley rotatably mounted on said frame, motor means mounted on said frame and being drive connected to said power driven pulley for rotating said power driven pulley, an idler pulley of essentially crowned configuration and being spaced laterally from said power driven pulley, an endless, workpiece surface finishing belt trained around said pulleys for advancement by said power driven pulley, an arm portion rotatably supporting said idler pulley at one end thereof, said arm portion forming a part of said frame and disposed between the opposing flights of said belt which extend between said pulleys, and handle means positioned on said frame and adapted to be grasped by a user for applying said belt to and guiding said belt along a workpiece surface, said power driven pulley comprising a substantially cylindrical, hub-mounted, elastically deformable pulley body formed with annular circumferentially extending, outwardly opening grooves defining a multiplicity of uniformly diametered, radially extending, flexible, belt-engaging ribs.

4. The power driven tool defined in claim 3 wherein the crowned configuration of said idler pulley is defined by a multiplicity of parallel spaced apart elastically deformable belt-engaging ribs.

References Cited

UNITED STATES PATENTS

| | | | |
|---|---|---|---|
| 1,717,995 | 6/1929 | Moore | 51—170.4 |
| 1,821,624 | 9/1931 | Emmons | 51—170.4 |
| 2,199,069 | 4/1940 | Fowler | 51—170.4 X |
| 2,300,643 | 11/1942 | Bostwick | 51—135 |
| 2,477,358 | 7/1949 | Adams | 51—135 |
| 2,593,158 | 4/1952 | Lorig. | |
| 2,815,613 | 12/1957 | Sittert | 51—135 |
| 3,176,436 | 4/1965 | Anton | 51—148 X |
| 3,196,701 | 7/1965 | Morrow | 74—230.7 |
| 3,334,447 | 8/1967 | Leveque | 51—170 X |

ROBERT C. RIORDON, Primary Examiner

D. G. KELLY, Assistant Examiner

U.S. Cl. X.R.

51—148